J. M. CALLAHAN.
SWAGGER STICK.
APPLICATION FILED MAR. 21, 1919.
1,339,162.
Patented May 4, 1920.
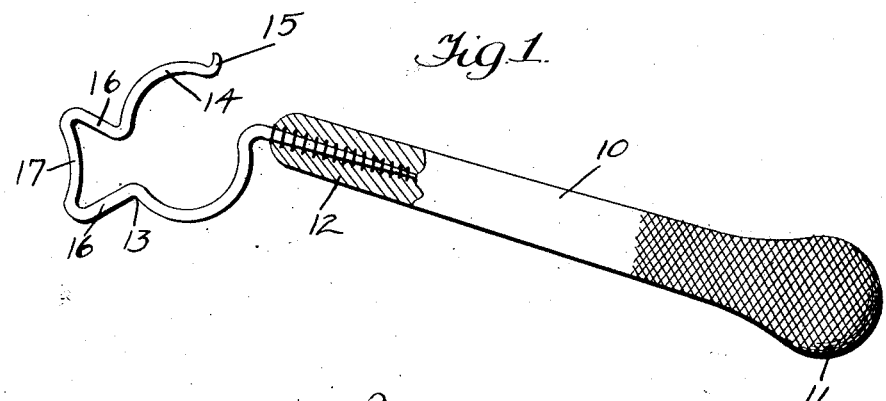
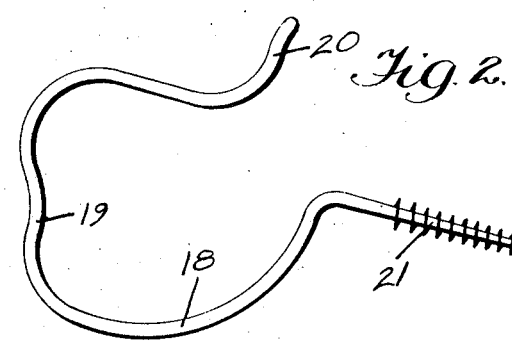
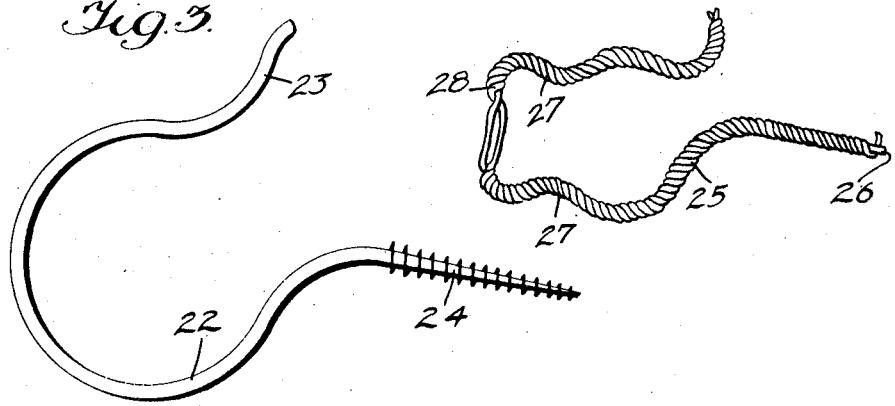
Inventor
J. M. CALLAHAN
By
Attorney

UNITED STATES PATENT OFFICE.

JAMES M. CALLAHAN, OF WASHINGTON, DISTRICT OF COLUMBIA.

SWAGGER-STICK.

1,339,162.  Specification of Letters Patent.  Patented May 4, 1920.

Application filed March 21, 1919. Serial No. 284,056.

*To all whom it may concern:*

Be it known that I, JAMES M. CALLAHAN, a citizen of the United States, and a resident of Washington, in the District of Columbia, have invented certain new and useful Improvements in Swagger-Sticks, of which the following is a specification.

My present invention relates generally to swagger sticks and more particularly to improvements therein for the purpose of permitting of practical use of a device of this character in many instances of ordinary every day life, for which swagger sticks as now constructed are neither intended or adapted, and my object is the provision of such simple improvements of an economical nature, capable of effective, efficient use as above stated, and for the particular purposes, among others, which I will hereinafter explain and point out.

In the accompanying drawing illustrating my present invention,

Figure 1 is a side view, partly broken away and in section, showing a swagger stick constructed in accordance with my invention, Fig. 2 is an enlarged side view of an engaging implement fashioned in accordance with my invention, Fig. 3 is a similar view of a slightly modified form of engaging implement, and Fig. 4 is a side elevation of still another modified form of engaging element.

Referring now to these figures, the swagger stick as proposed by my invention consists of an elongated handle 10 which I preferably enlarge at one end, as at 11, to provide for more effective hand-grip, the latter end of the handle being either plain or knurled as shown in Fig. 1.

At its opposite end, the handle 10 is preferably rounded with an end surface capable of receiving an elongated screw 12, which extends lengthwise into the respective end of the handle and is formed upon one end of an engaging member or implement seen at 13, and preferably in the general form of a hook, upon the extremity of one of the extensions of which the screw 12 is carried.

The other extension 14 of the hook-shaped engaging implement is free and preferably terminates in a reversely curved or outturned extremity 15 so that the free extension of the hook may be readily placed over a door knob, hand strap rail, or seat rail or handle of a street car, or in fact, many other objects encountered in every day life and in the nature of disease spreaders by virtue of contamination from so frequent handling.

The engaging member or implement 13 as illustrated in Fig. 1 is also provided with angularly bent outer portions 16 forming a substantially flat outer portion or head 17 which may be made to engage the flat surface of a door, or any other flat surface in pushing a door or object to or from closed position for instance, and it will be noted that these angular portions 16 with the substantially flat head 17 form within the outer portion of the hook-shaped engaging implement, a second engaging hook or loop capable of receiving smaller articles than the main loop.

The particular construction of the hook-shaped implement may be varied, however, as for instance seen in Fig. 2 where the generally hook-shaped engaging implement has its outer portion flattened as at 19, without the angular portion 16 of Fig. 1 and without the formation of a second engaging loop or hook. The free end of the implement 18 of Fig. 2 terminates in a reversely curved extremity 20, however, as previously described in connection with Fig. 1 and its opposite end supports a screw 21 for engagement within a handle like the handle 10 of Fig. 1.

As seen in Fig. 3 furthermore, the hook-shaped implement 22 may be curved regularly throughout its length and the outer flattened head, either with or without the formation of a second hook, may be dispensed with, and it will be noted that in the form of Fig. 3 and in the preceding forms, the free end of the engaging member terminates in a reversely curved or outturned extremity 23 and its opposite end carries a stick or handle engaging screw 24.

As seen in Fig. 4 the engaging implement 25, of the general hook-shape as previously described in connection with the forms of Figs. 1 to 3 inclusive, may be constructed of twisted wires whose strands appear at 26. In this form of the invention I have shown the hook-shaped implement with angular portions 27 forming an outer flattened head 28, and it will be noted that in order to introduce a new element into this construction capable of effective use in certain instances, I have separated the strands 26 for a portion of the length of the head 28, leaving them in spaced parallel relation to form a key-receiving slot, or a slot for receiving and turning other objects of a similar nature or a nature which adapts or lends itself to disposition within the slot. In this way additional use of the engaging implement is promoted.

In either of the forms of my invention as thus described, and it is to be borne in mind that other forms may be adopted, it is obvious that I have succeeded in providing a simple, effective device whose result is a material advance along the line of sanitation, and that my invention while simple and inexpensive, will be effective and efficient in use and will turn to a useful purpose and end, an implement in the nature of a swagger stick ordinarily carried with little beyond mere ornamental effect.

I claim:—

1. A swagger stick comprising a handle having an engaging implement at one end in the form of a hook, having at its outer portion angular sections forming an outer substantially flat engaging head and a constricted portion between said head and said hook.

2. A swagger stick comprising a handle having an engaging implement at one end in the form of a hook, constructed of twisted wire strands, the strands of which are bent with respect to one another at the outer portion of the hooks and into permanently spaced relation to form a slot for the purpose described.

3. A swagger stick comprising a handle having an engaging implement at one end in the form of a hook, constructed of twisted wire strands, the outer portion of which hook is bent angularly and outwardly to form an outer engaging head, and the strands of which are bent into permanently spaced relation along a portion of the said head to form between them a receiving slot, for the purpose described.

4. A swagger stick comprising a handle having an engaging implement at one end forming a main hook, and provided with a free outwardly curved extremity, said implement having outwardly projecting angular extensions offsetting a portion of the main hook and forming a supplemental hook having an outer substantially flat head and a constricted portion between the main hook and the supplemental hook.

JAMES M. CALLAHAN.